United States Patent
Cao et al.

(10) Patent No.: US 7,408,395 B2
(45) Date of Patent: Aug. 5, 2008

(54) CIRCUITS AND METHODS FOR FAST-SETTLING SIGNAL ALIGNMENT AND DC OFFSET REMOVAL

(75) Inventors: Kanyu Cao, Cupertino, CA (US); Yiping Fan, Fremont, CA (US); Hongyu Li, Cupertino, CA (US); Chieh-Yuan Chao, Fremont, CA (US)

(73) Assignee: Hyperband Communication, Inc., Milpitas, CA (US)

( * ) Notice: Subject to any disclaimer, the term of this patent is extended or adjusted under 35 U.S.C. 154(b) by 0 days.

(21) Appl. No.: 10/428,444

(22) Filed: May 1, 2003

(65) Prior Publication Data

US 2004/0217797 A1    Nov. 4, 2004

(51) Int. Cl.
*H03L 5/00*    (2006.01)
(52) U.S. Cl. .................. 327/307; 327/330; 327/553
(58) Field of Classification Search ............. 327/307, 327/311, 319, 320, 321, 330, 551, 552, 553, 327/558; 330/253; 455/307, 296, 234.1, 455/232.1, 230, 63.1
See application file for complete search history.

(56) References Cited

U.S. PATENT DOCUMENTS

| | | | | |
|---|---|---|---|---|
| 2,892,937 A | * | 6/1959 | Mirzwinski | ............. 327/165 |
| 5,579,214 A | * | 11/1996 | Kitani et al. | ............. 363/44 |
| 6,154,066 A | * | 11/2000 | Wen et al. | ............. 327/65 |
| 6,259,300 B1 | * | 7/2001 | Yasuda et al. | ............. 327/333 |
| 6,304,144 B1 | * | 10/2001 | Yamazaki et al. | ............. 330/259 |
| 6,590,379 B2 | * | 7/2003 | Mercier | ............. 324/118 |

OTHER PUBLICATIONS

Peter M. Stroet, A Zero-IF Single Chip Transceiver for up to 22Mb/s QPSK 802.11b Wireless LAN. 2001 Digest of Technical Papers of IEEE International Solid-State Circuits Conference (ISSCC '01).
Peter M. Stroet, A Zero-IF Single Chip Transceiver for up to 22Mb/s QPSK 802.11b Wireless LAN. 2001 Visual Supplement of Technical Papers of IEEE International Solid-State Circuits Conference (ISSCC '01), 2001.

* cited by examiner

*Primary Examiner*—Tuan T. Lam
(74) *Attorney, Agent, or Firm*—Law Offices of Emil Chang

(57) ABSTRACT

Fast settling circuits and methods designed to align input signal amplitude level and to remove DC offset voltages with minimal loss of low frequency signal in receiving analog circuits are disclosed. With the key innovative circuits and methods for signal peak alignment, the disclosed circuits and methods achieve fast settling without significant attenuation of the input signal. Peak aligning circuits and methods can be implemented along with conventional RC AC coupling circuits. In applying the aligning circuits and methods to differential signal pair, DC offsets can be easily removed.

20 Claims, 6 Drawing Sheets

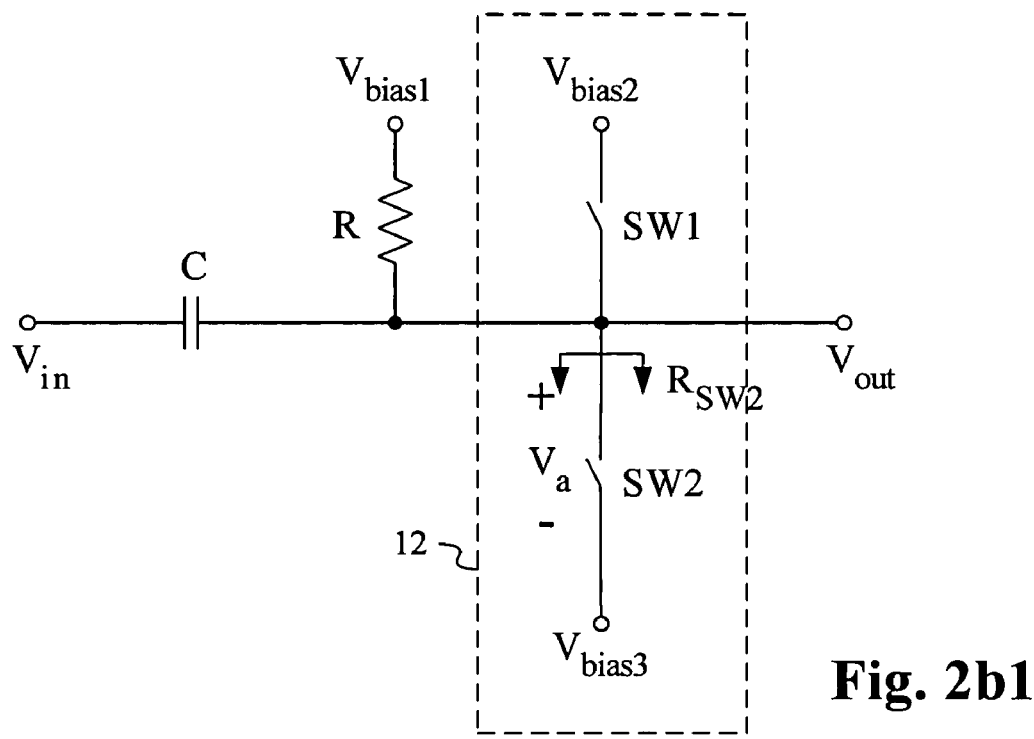
Fig. 2b1
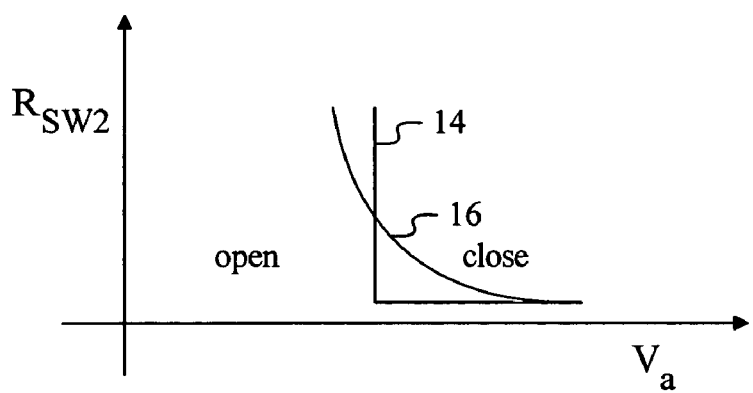
Fig. 2b2

CIRCUITS AND METHODS FOR FAST-SETTLING SIGNAL ALIGNMENT AND DC OFFSET REMOVAL

FIELD OF INVENTION

The present invention generally relates to circuits and methods for signal alignment and, in particular, circuits and methods for fast-settling signal alignment and DC offset removal.

BACKGROUND

In processing a received signal, the signal may have an unintended DC offset component that was not part of the original signal. This DC offset component may be introduced by a variety of sources as the signal is processed by the circuitry or in the stream. This DC offset component causes distortion and creates further undesirable effects to downstream circuitry. Thus, the removal of this undesirable DC offset component becomes an important issue in many applications. Furthermore, a received signal as is processed may also drift such that it no longer conforms to its original signal DC level. This signal will need to be re-aligned back to its original level or aligned at a desired level.

For example, zero-intermediate-frequency (Zero-IF) architectures have become very popular in radio frequency (RF) receivers due to its lower requirements on channel select filters and amplifiers. This type of architecture demands that the signal to be processed at low frequencies that are very close to zero. Hence, the removal of undesirable DC offset (at zero frequency) generated by mismatch, local oscillator (LO) leakage, or self-mixing without damaging low-frequency signal is a critical issue. Many transceivers use calibration techniques to remove DC offset. Although calibration techniques can effectively remove DC offset caused by mismatch and LO leakage, DC offset caused by self-mixing of a strong interferer and other operation-dependent sources can not be easily predicted and canceled. Calibration techniques also considerably increase circuit complexity and require close collaboration between analog and digital receiver chips.

Another method for DC offset removal is the insertion of a simple RC filter, as is illustrated in FIG. 1, which utilizes a capacitor to block DC voltage level and a resistor to provide DC bias for the following circuits. Cut-off frequency of this RC circuit should be small enough to reduce attenuation of signal intensity and group delay and be large enough to be able to settle to near asymptotic state within a required time that is specified by the standard. For example, in the IEEE802.11 standards for wireless local area network (WLAN) applications, cut-off frequency of less than 10 KHz is desired. A naïve implementation of this circuit with frequency this low would take hundreds of microseconds to settle. However, the standard also requires DC offset cancellation circuit to settle within a period of 800 nS, three orders of magnitude lower. Previous works by others have implemented switchable RC filters that can switch cut-off frequency from high to low in three or more steps. This method cannot reliably settle because the switching action itself will generate a DC offset depending on the signal levels at the input and the output at the switching instant. The fundamental reason of switching-induced DC offset will be explained in more details later in this disclosure.

In analyzing a simple RC filter as illustrated in FIG. 1, a differential equation can be derived to describe the filter's behavior in the time domain.

$$C\frac{d(V_{out} - V_{in})}{dt} = -\frac{V_{out}}{R} \quad (1)$$

With the initial condition $$V_{out}|_{t=0} = V_0 \quad (2)$$

The solution is $$V_{out} = \frac{\int_0^t p(t')\frac{dV_{in}(t')}{dt'}dt' + V_0}{p(t)}, \quad p(t) = e^{\int_0^t (RC)^{-1} dt'} \quad (3)$$

Define cut-off frequency $f_T$ to be:

$$f_T = \frac{1}{2\pi RC} \quad (4)$$

Assume that at time $t=t_0$, the cut-off frequency is changed from $f_T$ to $f_T'$ and the input signal can be decomposed into $$V_{in} = \sum_{n=0}^{m} A_n e^{j(\omega_n t + \phi_n)} \quad (5)$$

If $\omega_T = 2\pi f_T$ is assumed to be constant, it can be derived that $$V_{out} = \sum_{n=1}^{m}\left\{\frac{1}{1 - j\frac{\omega_T}{\omega_n}}A_n e^{j(\omega_n t + \phi_n)} + \frac{V_0}{p(t)} - \frac{A_n e^{j\phi_n}}{p(t)} \cdot \frac{1}{1 - j\frac{\omega_T}{\omega_n}}\right\} \quad (6)$$

In Equation (6), it is evident that the output voltage consists of three components: the desired signal represented by the first term in the bracket; the decaying voltage caused by initial condition of output voltage; and the decaying term caused by the instantaneous input signal level at initial time. Equation (6) shows that frequency switching will introduce other DC offset voltages itself while removing DC offset changes from the input. This switching-induced DC offset is proportional to the input signal amplitude and depends on the signal level at the input and the output at the switching instant. One of the challenges here is to remove this DC offset voltage in a fast and efficient manner so that information can be extracted from the signal.

Innovative circuits and methods for fast-settling signal alignment and for removing of DC offset are therefore desired to overcome the shortcoming of prior art technologies.

SUMMARY OF THE INVENTION

It is therefore an object of the present invention to provide circuits and methods for fast-settling of a signal with a low cut-off frequency;

It is another object of the present invention to provide circuits and methods for alignment of a signal; and It is yet another object of the present invention to provide circuits and methods for removing DC offsets from a signal.

Briefly, circuits and methods for fast settling signal alignment and for fast-settling DC offset removal are disclosed. In one preferred embodiment of the present invention, in processing an input signal, a circuit comprising a capacitor having one end connected to an input node for receiving the input signal and having a second end connected to an output node, a resistor having one end connected to said output node and a second end connected to a first bias voltage source, and an aligner having one end connected to the output node for aligning the peak level of the input signal. The aligner can be implemented in a variety of manners. In processing the input signal, the input signal is first clamped by the use of two bias voltages, then released and gradually brought down to the desired DC level. In another preferred embodiment of the present invention, in processing a differential signal pair, the signal alignment circuit of the present invention is connected in parallel to align the differential signal pair to the same DC level and in effect removes any DC offsets from the differential signal pair.

An advantage of the present invention is that it provides circuits and methods for fast-settling of a signal with a low cut-off frequency;

Another advantage of the present invention is that it provides circuits and methods for alignment of a signal; and Yet another advantage of the present invention is that it provides circuits and methods for removing DC offsets from a signal.

IN THE DRAWINGS

Figure 1:
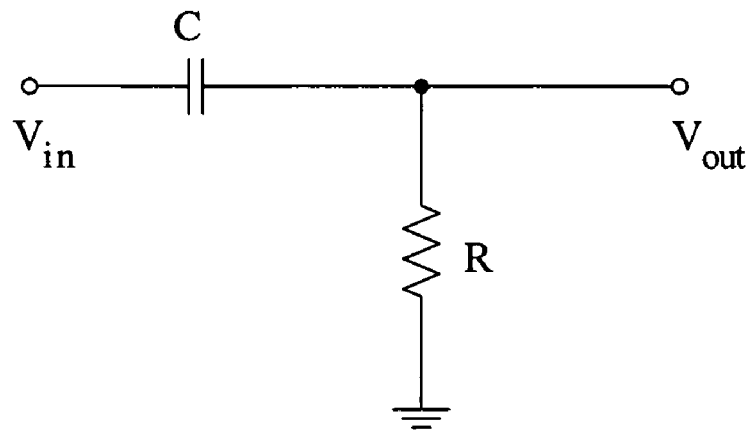
FIG. 1 illustrates a simple RC filter.
Figure 2A:
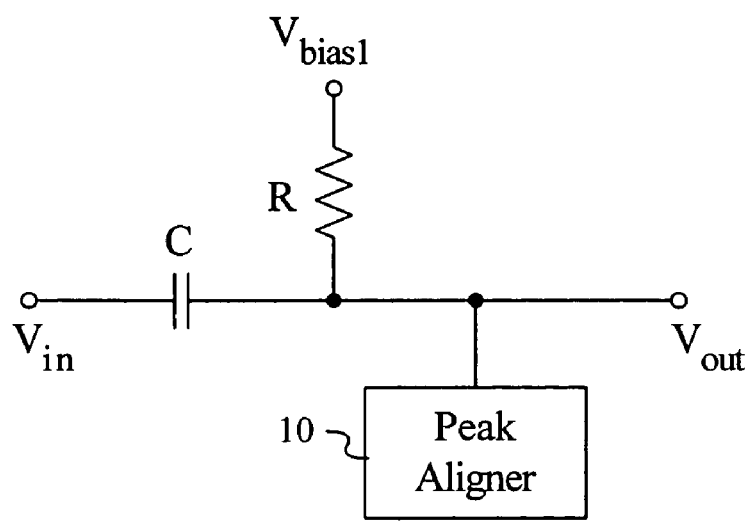
FIG. 2a illustrates a generalized embodiment of the present invention of an AC coupling, signal alignment circuit.
Figure 2C:
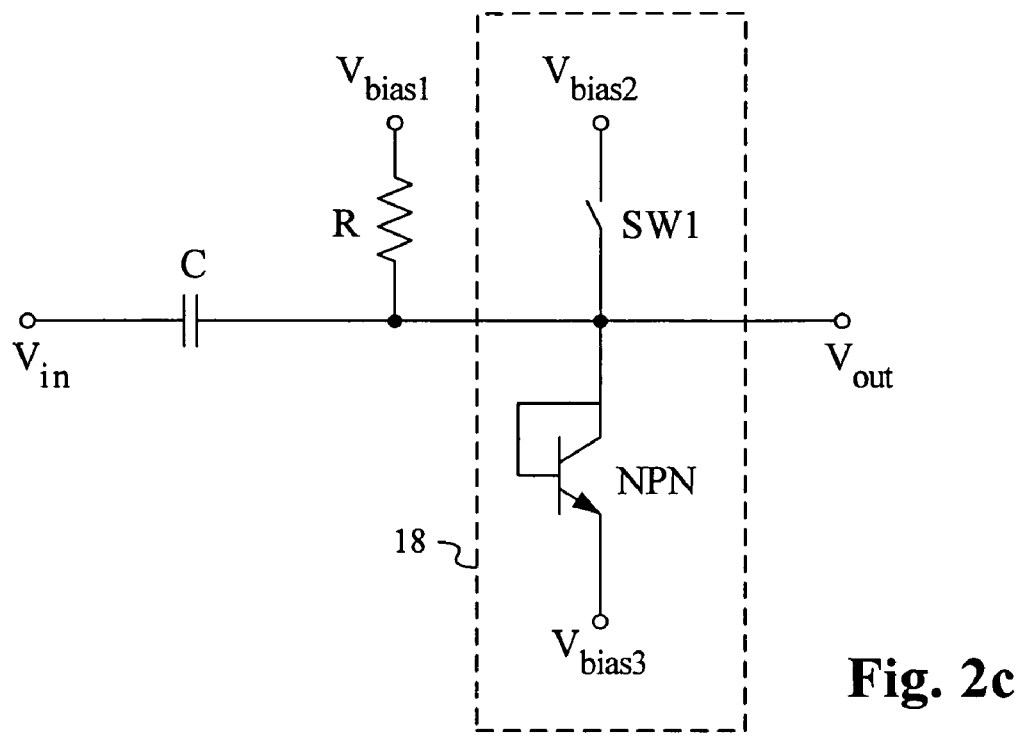
Figure 2D:
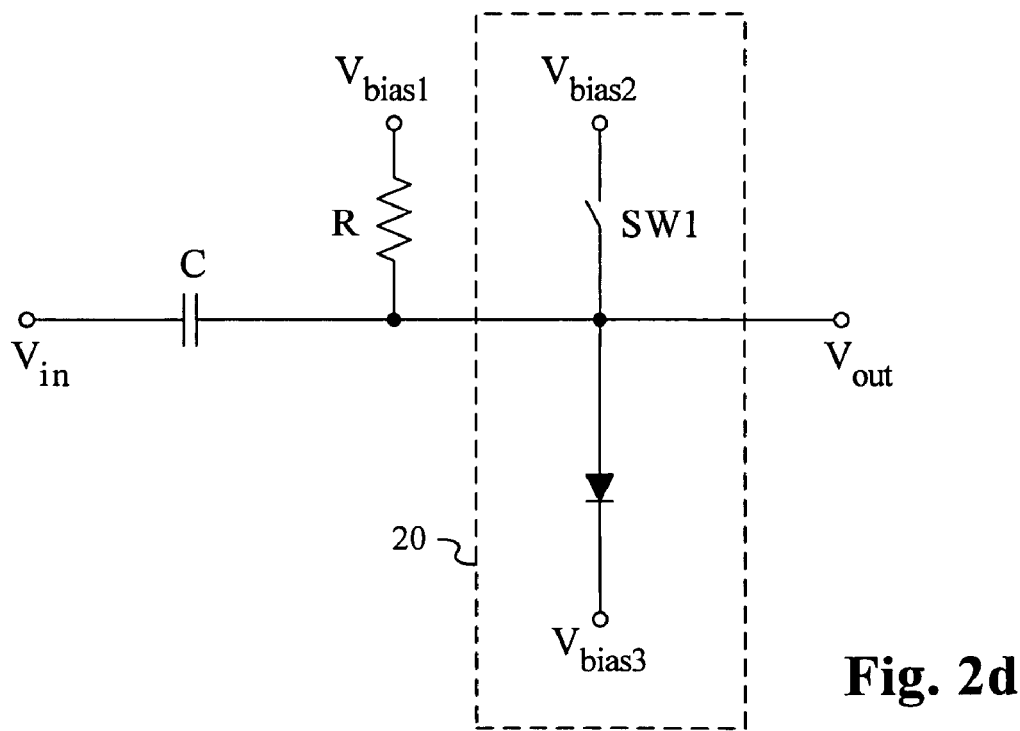
Figure 4:
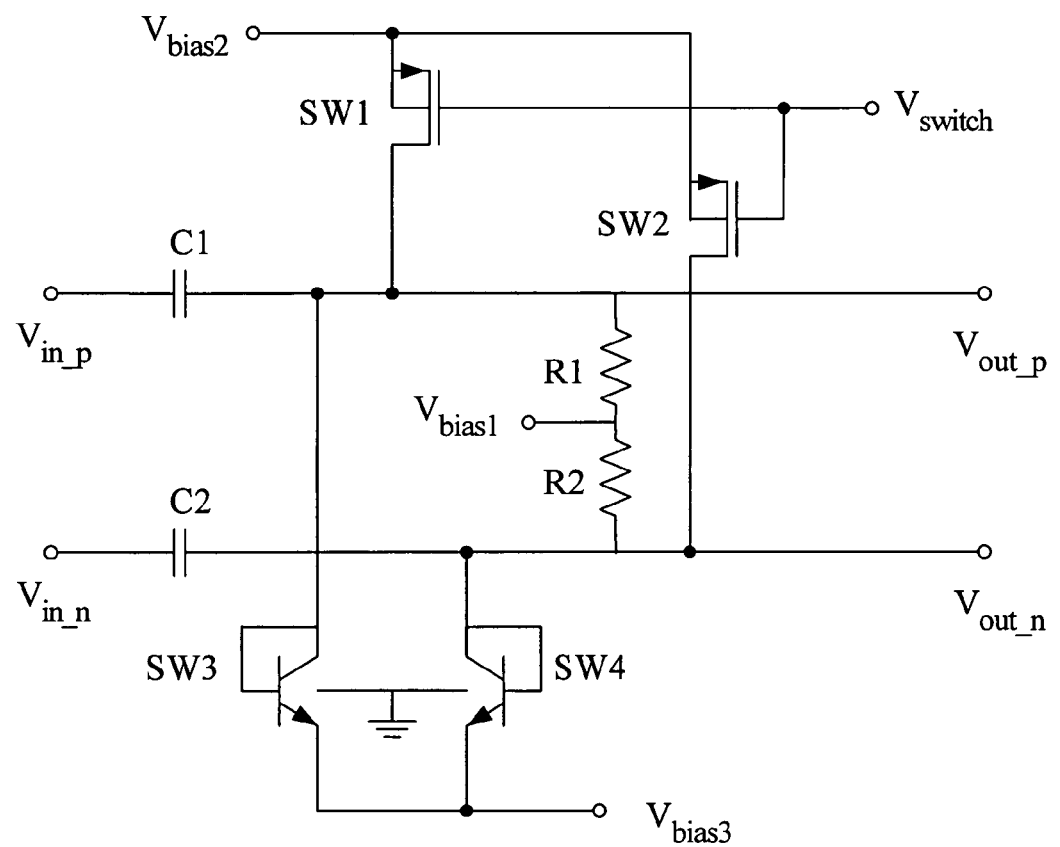
Figure 5A:
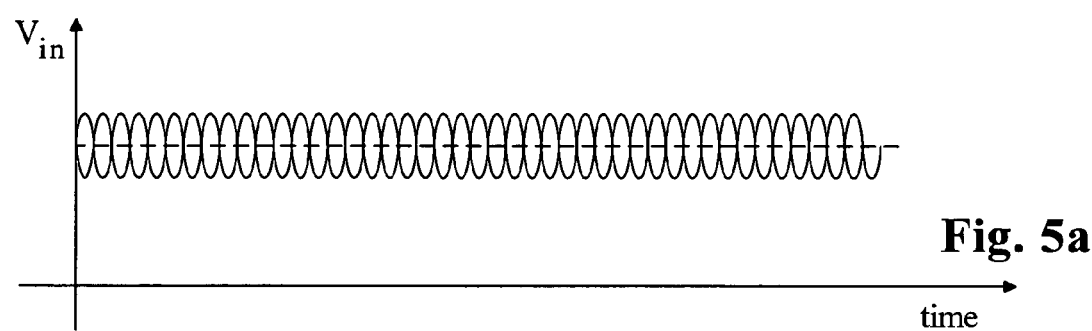

FIG. 2b1 illustrates a presently preferred embodiment of the present invention of an AC coupling, signal alignment circuit having a voltage dependent switch;

FIG. 2b2 illustrates the resistance of SW2 as a function of $V_a$;

FIG. 2c illustrates an alternative embodiment of the present invention;

FIG. 2d illustrates yet another alternative embodiment of the present invention;

FIGS. 3a-3d illustrate the various states of the nodes of the circuit of FIG. 2c;

FIG. 4 shows the schematic of the presently preferred embodiment of a circuit for removing DC offset;

FIG. 5a illustrates a differential signal pair without DC offset; and

Figure 5B:
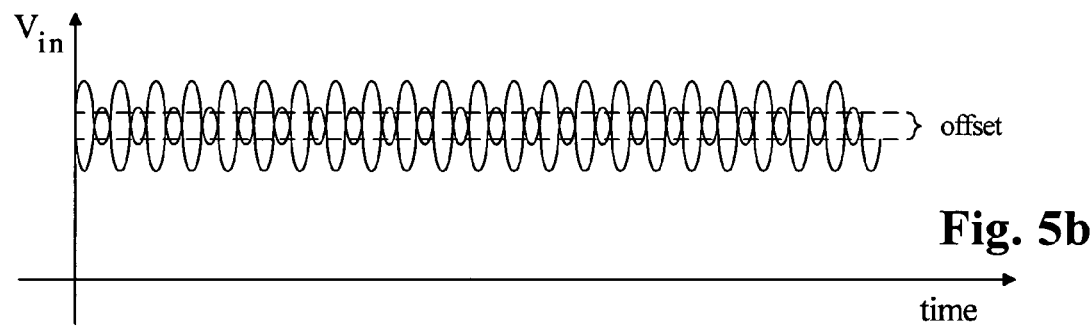

FIG. 5b illustrates a differential signal pair with DC offset.

DETAIL DESCRIPTION OF THE PREFERRED EMBODIMENTS

When the circuit as shown in FIG. 1 is working at the low corner frequency as low as 10 KHz, the output node $V_{out}$ can be regarded as a floating node from the perspective of input signals that are at least 300 KHz. FIG. 2a illustrates a general embodiment of the present invention, where a circuit is disclosed having a capacitor connected at one end to an input node, $V_{in}$, and connected at the other end to an output node, $V_{out}$; a Vbias1 voltage passing through a resistor R to provide DC bias for $V_{out}$; and an alignment circuit for tuning the alignment of the input signal. In the preferred embodiments, the alignment circuit is a peak alignment circuit.

In a presently preferred embodiment of the present invention, referring to FIG. 2b1, the aligner circuit 10 of FIG. 2a is implemented by two components, a switch SW1 having a $V_{bias2}$ voltage at one end and connected to the $V_{out}$ node at the other end, and a voltage-dependent switch, SW2, having a $V_{bias3}$ voltage at one end and, likewise, connected to the $V_{out}$ node at the other end. Referring to FIG. 2b2, the voltage-dependent switch, SW2, depends on the relative voltage levels of $V_{bias3}$ versus $V_{out}$, $V_a$, to open or close. If the difference between $V_{out}$ and $V_{bias3}$ is sufficiently high (meaning a diode drop voltage if SW2 is implemented as a diode connected transistor or a diode), SW2 closes, and if the difference between $V_{out}$ and $V_{bias3}$ is low, SW2 opens. In the ideal case 14, SW2 opens and closes over a short span of voltage. However, in the practical case of a diode switch, i.e. case 16, SW2 gradually opens and closes. Referring to FIG. 2c, in an alternative preferred embodiment, the voltage-dependent switch is implemented using a NPN transistor. Referring to FIG. 2d, in yet another alternative embodiment, the voltage-dependent switch is implemented using a diode. Note that any applicable types of voltage-dependent switches, e.g. various types of transistors and diodes, may be used. Further note that SW1 of the aligner circuit can be implemented by a certain type of transistor as well.

Here, referring to FIG. 2c, in operation if the output node is pre-charged through SW1 to the $V_{bias2}$ voltage, after SW1 is opened and the alignment circuit is enabled, the diode-connected NPN transistor will decrease the DC voltage at the $V_{out}$ node until its peak voltage does not turn on the discharge diode. Thus, the $V_{bias3}$ voltage affects the level in which the input signal may be aligned.

Figure 3A:
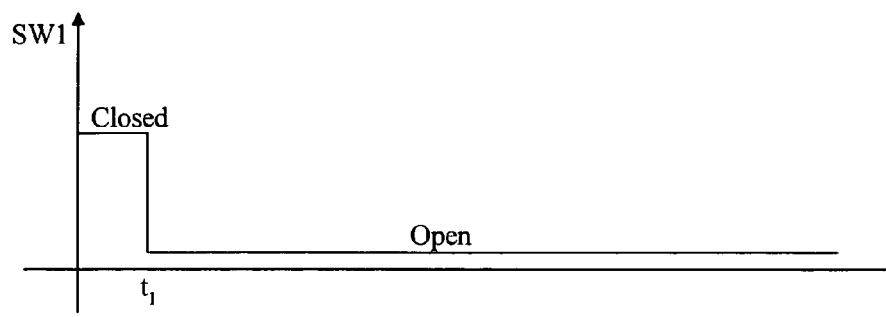
Figure 3B:
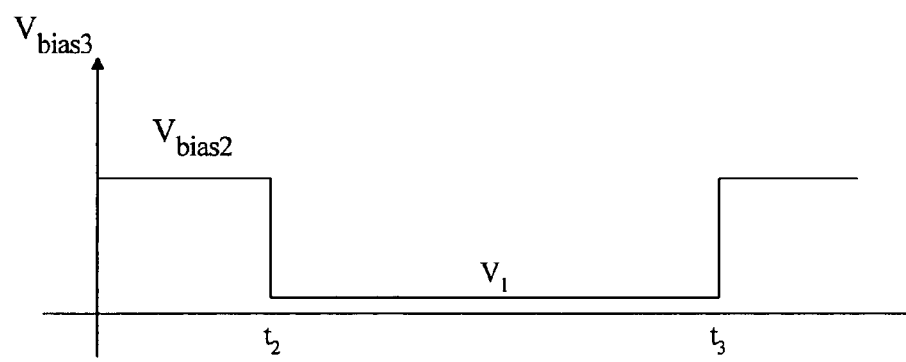
Figure 3C:
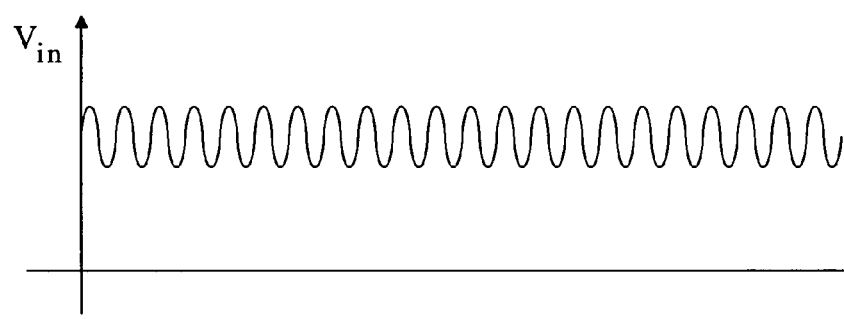
Figure 3D:
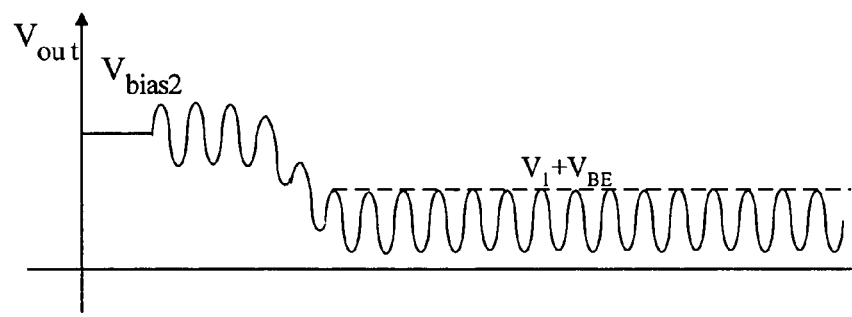

The detailed operational states of the circuit illustrated in FIG. 2c are explained by the illustrations of FIGS. 3a-3d. Here, the turn-on voltage of NPN is assumed to be $V_{BE}$, which is roughly 0.7V. When the circuit is required to perform signal alignment at time instant t=0, SW1, referring to FIG. 3a, is closed and $V_{out}$, referring to FIG. 3d, is pre-charged to the $V_{bias2}$ voltage. The $V_{bias3}$ voltage, referring to FIG. 3b, is kept at the off state where $(V_{bias3}+\text{diode drop }(0.7V)) \geqq V_{bias2}$ so that there is no large DC leakage current from $V_{bias2}$ to $V_{bias3}$. During this time period, the input signal can be said to be clamped as established by the pre-charge of $V_{bias2}$. At time $t_1$, SW1 is opened. By opening SW1, the clamp on $V_{out}$ is released and the $V_{out}$ voltage is allowed to be adjusted. At this time, a switching-induced DC offset is generated by, as explained in the previous section, the switching of the circuit component itself, which causes distortion to the input signal in terms of DC offset. After the passing of a very short time period from time $t_1$, at time $t_2$, $V_{bias3}$ is lowered to a predefined voltage, $V_1$, which can be at any level and is illustrated here to be significantly lower than the $V_{bias2}$ less $V_{BE}$ $(V_{bias2}-V_{BE})$ voltage. In this manner, $V_{out}$ will discharge until the peak signal value of the input signal is lower than $V_{bias3}+V_{BE}$. At time $t_3$, as an option, $V_{bias3}$ is increased to the $V_{bias2}$ voltage level in order to remove the effects of the alignment circuit completely thereby preventing accidental undesirable effects.

In an alternative preferred embodiment of the present invention, in extending the circuits of FIGS. 2a-2d to differential signal pairs, FIG. 4 illustrates one embodiment of present invention for processing a differential signal pair, where circuits similar to those described in FIGS. 2a-2d are used on each path of the positive, Vin_p, and negative, Vin_n, input signals. Here, transistors SW1 and SW2 replace the switch that connects $V_{out}$ and $V_{bias2}$ and these transistors are controlled by the applicable voltage at the $V_{switch}$ node for turning the transistors on or off; a $V_{bias1}$ voltage again is applied at the node to the resistors R1 and R2; and a $V_{bias3}$ voltage controls the two transistors, SW3 and SW4, as peak aligning switches. Here, the peak values of the signals are set to an equal value by the rectifying diodes, thereby removing any DC offset of the signal pair. FIG. 5a illustrates waveforms of the differential signal pair if there is no DC offset between the positive and the negative signals. FIG. 5b illustrates the waveforms of the differential signal pair where there is a DC offset. The circuits of the present invention in applying to differential signal pairs remove the DC offsets so that the signal pair can be properly processed. It should be noted that it is within the scope of this invention to combine circuits presented in FIGS. 2a-2d in application to differential signal pairs or combinations thereof.

The circuits described herein can be implemented with NPN type BJTs with connected collector and base terminals as effective diodes. However, other type of devices with rectifying characteristics such as diodes, NMOS or PMOS devices with connected gate and drain nodes can also be used.

Other Alternative Implementations

Note that although the invention disclosed herein referred to a peak alignment method, it shall be understood that other alignment methods can be used as well including but not limited to average peak alignment, either average of positive peaks or average of both positive and negative peaks, etc. Furthermore, there are many other ways to utilize the method of signal alignment. For example, it is also possible to align the signal levels from the negative voltage levels. To do this, the output nodes need to be first discharged to a lower DC level, then pull-up diodes are used to align the negative peak. Note that the word "peak" is used in this disclosure to describe both the maximum signal level, which is typically a positive value (sometime referred to as positive peak), and the minimum signal value (sometime referred to as negative peak).

While the present invention has been described with reference to certain preferred embodiments, it is to be understood that the present invention is not to be limited to such specific embodiments. Rather, it is the inventor's contention that the invention be understood and construed in its broadest meaning as reflected by the following claims. Thus, these claims are to be understood as incorporating and not only the preferred embodiment described herein but all those other and further alterations and modifications as would be apparent to those of ordinary skilled in the art.

We claim:

1. A circuit for signal alignment, comprising:
   a capacitor having a first end and a second end, said first end connected to an input node and said second end connected to an output node;
   a resistor having a first end connected to said output node and a second end connected to a first bias voltage source; and
   a peak alignment circuit having a first end connected to said output node, wherein said peak alignment circuit having at least two operating states, a signal alignment state and a normal operating state.

2. A circuit as recited in claim 1 wherein said alignment circuit comprises of a first switch and a second switch, said first switch having a first end connected to said output node and a second end connected to a second bias voltage, and said second switch having a first end connected to said output node and a second end connected to a third bias voltage.

3. A circuit as recited in claim 2 wherein said first switch is a transistor.

4. A circuit as recited in claim 2 wherein said first switch is a MOS transistor.

5. A circuit as recited in claim 2 wherein said second switch is a voltage-dependent switch.

6. A circuit as recited in claim 2 wherein said second switch is a diode connected transistor.

7. A circuit as recited in claim 2 wherein said second switch is a diode.

8. A method for aligning a signal, comprising the steps of:
   clamping said signal using a second bias voltage and a third bias voltage;
   releasing said second bias voltage to allow for the adjustment said signal; and
   varying said third bias voltage to affect the peak level of said signal.

9. A method as recited in claim 8 further comprising an additional step after said varying step for adjusting said third bias voltage to prevent said varied signal from drifting.

10. A method as recited in claim 8 wherein said second bias voltage is relatively higher than said third bias voltage for positive peak alignment and lower for negative peak alignment.

11. A circuit for removing DC offset from a differential signal pair, said differential signal pair having a first signal and a second signal, comprising:
    a first capacitor having a first end and a second end, said first end connected to a first input node for receiving said first signal and said second end connected to a first output node;
    a second capacitor having a first end and a second end, said first end connected to a second input node for receiving said second signal and said second end connected to a second output node;
    a first resistor having a first end connected to said first output node and a second end connected to a first bias voltage source;
    a second resistor having a first end connected to said second output node and a second end connected to said first bias voltage source; and
    a peak alignment circuit having a first end connected to said first output node and a second end connected to said second output node, wherein said peak alignment circuit having at least two operating states, a signal alignment state and a normal operating state.

12. A circuit as recited in claim 11 wherein said alignment circuit comprises
    a first switch, said first switch having a first end connected to said first output node and a second end connected to a second bias voltage;
    a second switch, said second switch having a first end connected to said second output node and a second end connected to said second bias voltage;
    a third switch, said third switch having a first end connected to said first output node and a second end connected to a third bias voltage; and
    a fourth switch, said fourth switch having a first end connected to said second output node and a second end connected to said third bias voltage.

13. A circuit as recited in claim 12 wherein said first switch is a MOS transistor.

14. A circuit as recited in claim 12 wherein said second switch is a MOS transistor.

15. A circuit as recited in claim 12 wherein said third switch is a voltage-dependent switch.

16. A circuit as recited in claim 12 wherein said third switch is a diode connected transistor.

17. A circuit as recited in claim 12 wherein said third switch is a diode.

18. A circuit as recited in claim 12 wherein said fourth switch is a voltage-dependent switch.

19. A circuit as recited in claim 12 wherein said fourth switch is a diode connected transistor.

20. A circuit as recited in claim 12 wherein said fourth switch is a diode.

* * * * *